A. HANSON.
GLASS HEATING APPARATUS.
APPLICATION FILED JAN. 6, 1910.

959,057. Patented May 24, 1910.

Witnesses
Inventor
Amandus Hanson
By James Sheehy
Attorney

UNITED STATES PATENT OFFICE.

AMANDUS HANSON, OF CANEY, KANSAS.

GLASS-HEATING APPARATUS.

959,057. Specification of Letters Patent. Patented May 24, 1910.

Application filed January 6, 1910. Serial No. 536,708.

*To all whom it may concern:*

Be it known that I, AMANDUS HANSON, citizen of the United States, residing at Caney, in the county of Montgomery and State of Kansas, have invented new and useful Improvements in Glass-Heating Apparatus, of which the following is a specification.

My present invention has to do with the flattening of window glass; and it has for its object to provide improved means for conducting flame and other products of combustion from a burner or burners into a glass-heating chamber, with a view of utilizing said products to the best advantage in heating glass placed in the chamber, and economizing in the use of gas—*i. e.*, preventing the dissipation of the heat values and the consequent objectionable high heating of the chamber, so that the adequate heating of the glass may be accomplished with the consumption of but a minimum amount of gas.

Figure 1:
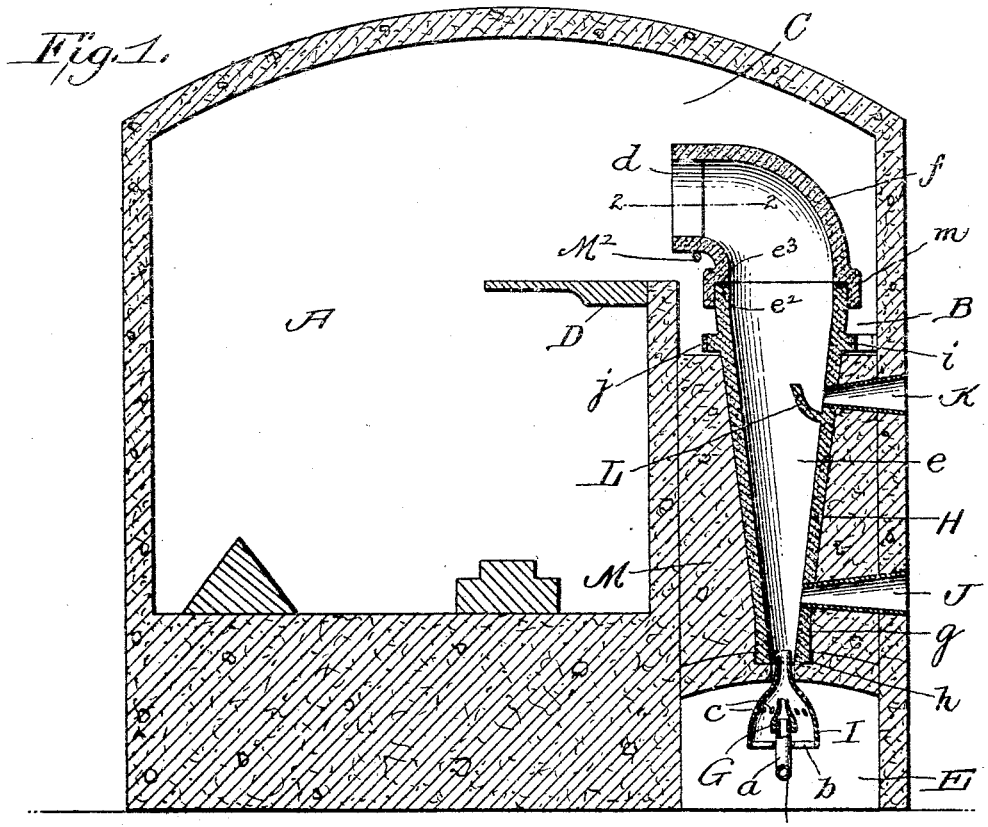
Figures 2, 3:
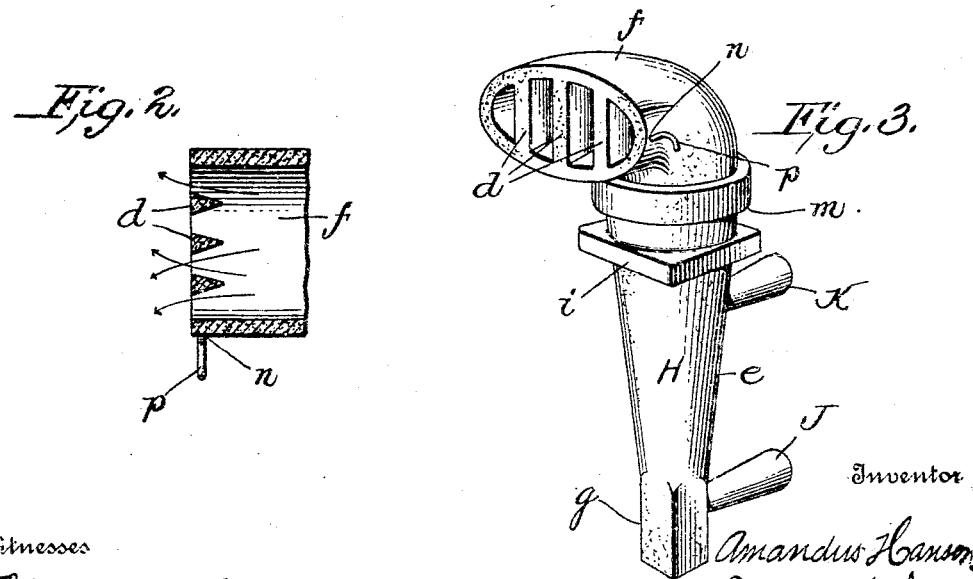

With the foregoing in mind, the invention will be fully understood from the following description and claims, when the same are read in connection with the drawings, accompanying and forming part of this specification, in which:

Figure 1 is a vertical section taken through a glass-heating chamber equipped with my improvements. Fig. 2 is a detail horizontal section, taken in the plane of the line 2—2 of Fig. 1 and showing the wedge-shaped deflectors for scattering the products of combustion as the same enter the chamber. Fig. 3 is a perspective view of one of my novel conductors, removed.

Similar letters designate corresponding parts in all of the views of the drawings, referring to which:

A is a glass-heating chamber which may be and preferably is of the ordinary construction.

B is a sub-chamber, located at one side of the upper portion of the chamber A and connected therewith through an opening C.

D is the conventional "shade stone", arranged in the chamber A, immediately below the opening C.

E is the conventional conduit disposed at one side of the lower portion of the chamber A. F is a gas supply pipe that extends into said conduit, and G is a nozzle arranged in said conduit and connected with said pipe.

The nozzle G may be and preferably is of the ordinary, well known construction, and in combination with the same to form a gas burner I prefer to employ the air-supply device or mixer I, Fig. 1. The said device I is fixed to and supported by the upstanding pipe arm *a* to which the nozzle G is connected; and it contains and extends above the nozzle and is provided with openings *b* in its bottom and openings *c* in its side, calculated to admit sufficient air to its interior to adequately support the combustion of gas in its upper, eduction portion.

H is a conductor constructed in accordance with my invention and having for its office to carry products of combustion from the burner to the interior of the upper portion of the chamber A and prevent dissipation of heat values from said products while *en route*.

A number of gas burners and complementary conductors H are employed; the same being arranged at a suitable distance apart throughout the length of the apparatus, but inasmuch as the burners are identical in construction, and the conductors H are identical in construction, I have deemed it sufficient to illustrate one burner and one conductor.

The conductor H is formed of fire clay or other suitable refractory material, and is gradually increased in size upward from the point at which it receives the upper end of the air-supply device I, this in order to permit of free ascent of the products of combustion. At its upper end the conductor is provided with an elbow, the mouth of which is directed toward the interior of the chamber A and is provided with three (more or less) deflectors *d*, of wedge-shape in horizontal section, the latter to spread the flames and other products of combustion in the interior of the chamber A.

In the present and preferred embodiment of my invention, the conductor H comprises a lower section *e* and an upper or elbow section *f*. The lower section *e* is provided with a lower end *g*, of angular form in cross-section, which is disposed in a similar opening *h* in the top wall of the conduit E for the purpose of preventing the said section from turning about its axis. Near its upper end, the section *e* is provided with an exterior portion *i*, of angular form in cross-section, designed for the engagement of a fixed angular brace *j* which assists in holding the section against turning about its axis. It will also be seen by reference to the drawings that the section $e$ is provided with lower and upper, inwardly tapered induction tubes J and K, calculated to supply ample air to maintain sufficient draft and adequately support combustion in the conductor, and that an upwardly disposed deflector L is arranged in the conductor opposite the inner end of the induction tube K for assisting the upward passage of the products of combustion and air at that point.

The upper or elbow section $f$ of the conductor is swiveled at $m$ on the section $e$, and is provided at $n$ with a loop $p$, formed of fire-clay, with which may be engaged a hook or the like (not shown) through the medium of which the section $f$ may be turned to direct the products of combustion to various points inside the chamber A.

With a view to preventing the radiation of heat from the section $e$ of the conductor H, I surround the said section by brickwork indicated by M.

The operation of my improvements will be readily understood from the foregoing; and it will be appreciated that the conductor H will prevent dissipation of the heat values and will carry practically all of said values into the chamber A for utilization in the heating of glass. From this it follows that glass may be adequately heated in the chamber A with the consumption of much less gas than is necessary in the operation of the ordinary glass heating apparatus.

At $M^2$ a support is provided on which the upper or elbow section $f$ of the conductor rests and is adapted to be moved, this with a view to preventing tilting of said section.

In the upper end of the conductor section $e$ is provided a groove $e^2$ in which a suitable fire-proof dust $e^3$ is placed in order to prevent adherence of the section $f$ to the section $e$ and assure free turning of said section $f$ when occasion demands.

While I have shown and described one form of my invention, it is to be understood that I am not limited to the details or the form or relative arrangement of parts disclosed, but that extensive modifications may be made therein, without departing from the spirit thereof.

Having described my invention, what I claim and desire to secure by Letters-Patent, is:

1. An apparatus for the purpose described, comprising a heating chamber, a burner located at one side of the lower portion thereof, and an upright conductor located at one side of said chamber and above the burner to receive the products of combustion therefrom; said conductor being made up of a lower upright section, and an upper section swiveled on the lower section and having a laterally deflected upper portion adapted to discharge said products into the upper portion of the heating chamber.

2. An apparatus for the purpose described, comprising a heating chamber, a burner located at one side of the lower portion thereof, and an upright conductor located at one side of said chamber and above the burner to receive the products of combustion therefrom; said conductor being made up of a lower upright section and an upper section swiveled on the lower section and having a laterally deflected upper portion adapted to discharge said products into the upper portion of the heating chamber, and being gradually increased in size from its lower portion to its upper end.

3. An apparatus for the purpose described, comprising a heating chamber, a burner located at one side of the lower portion thereof, and an upright conductor located at one side of said chamber and above the burner to receive the products of combustion therefrom, said conductor having a laterally deflected upper portion adapted to discharge said products into the upper portion of the heating chamber, and also having deflectors of wedge-shape in cross-section in its mouth.

4. An apparatus for the purpose described, comprising a heating chamber, a burner located at one side of the lower portion thereof, and an upright conductor located at one side of said chamber and above the burner to receive the products of combustion therefrom, said conductor having a laterally deflected upper portion adapted to discharge said products into the upper portion of the heating chamber, and also having lower and upper inwardly-tapered induction tubes connecting the interior of the conductor with the atmosphere, and further having an upwardly disposed deflector contained within it and arranged opposite the upper induction tube.

In testimony whereof I have hereunto set my hand in presence of two subscribing witnesses.

AMANDUS HANSON.

Witnesses:
J. T. EVERHART,
E. D. ROGERS.